Patented Aug. 1, 1950

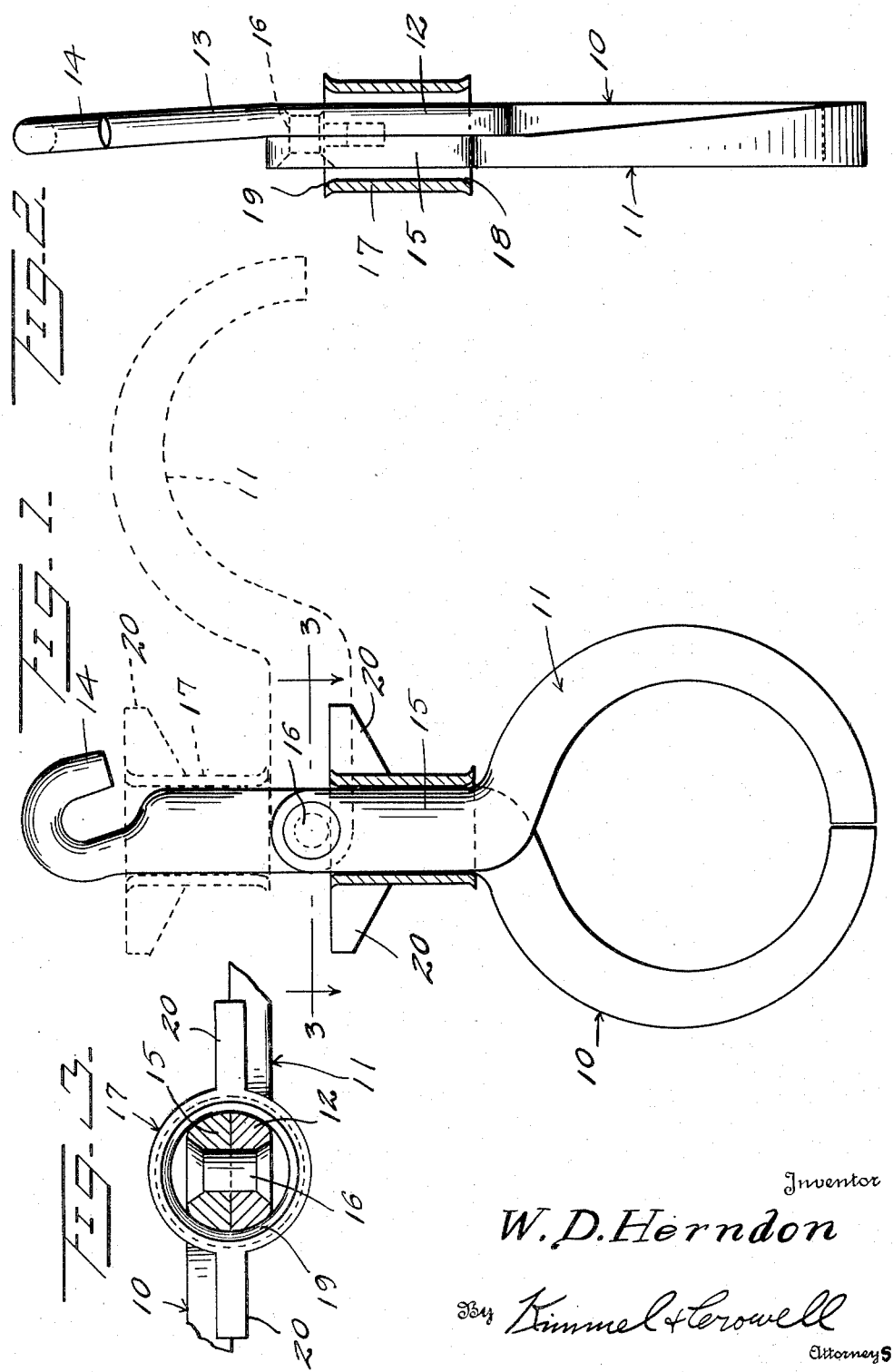

2,516,989

UNITED STATES PATENT OFFICE 2,516,989

SAFETY HOOK

Wilder D. Herndon, Jacksonville, Fla.

Application April 10, 1947, Serial No. 740,663

1 Claim. (Cl. 248—62)

This invention relates to a pipe or rod suspension hook.

An object of this invention is to provide an improved safety suspension hook adapted particularly for suspending steam heat connectors on railroad cars, which is automatically locked and eliminates the use of springs for holding the device in locked position.

Another object of this invention is to provide a supporting hook of this kind which includes a pair of complementary semi-circular hook members pivotally secured together, with one of the members having extending upwardly therefrom a shank which is formed with a supporting hook, there being a locking sleeve loosely disposed about the shank having oppositely extending lugs thereon which provide a means for moving the sleeve upwardly to released position in addition to providing weight means for gravitatingly holding the sleeve in locked position.

With the above and other objects in view, my invention consists in the arrangement, combination and details of construction disclosed in the drawings and specification, and then more particularly pointed out in the appended claim.

In the drawings,

Figure 1 is a detail side elevation, partly in section, of a suspension hook constructed according to an embodiment of this invention, Figure 2 is a detail end elevation, partly in section, of the device, Figure 3 is a sectional view taken on the line 3—3 of Figure 1.

Referring to the drawing, the numerals 10 and 11 designate generally a pair of substantially semi-circular complementary hook members which are adapted when in closed position to form a circle for clamping about a pipe or rod to firmly hold the pipe or rod to a supporting element, as will be hereinafter described.

The hook member 10 has formed integral therewith an upwardly extending shank 12 which is bent obtusely, as indicated at 13, and the shank 12 at its upper end is formed with a hook 14 for engagement over a support to dependingly support the device from the supporting element.

The hook member 11 is formed with an elongated upwardly extending shank 15 which is shorter in length than the shank 12 and is pivotally secured to the shank 12 by means of a pivot member 16.

In order to releasably lock the hook members 10 and 11 in operative position about a pipe or rod, I have provided a cylindrical locking sleeve 17 which is adapted when in locked position to loosely engage about the two shanks 12 and 15, as shown in full lines in Figures 1 and 2.

The lower edge of the locking sleeve 17 is outwardly flared, as indicated at 18, and the upper edge of the sleeve 17 is also outwardly flared, as indicated at 19. The locking sleeve 17 has extending therefrom a pair of oppositely extending lugs or arms 20 which form operating means whereby the sleeve may be moved upwardly to released position and also form weight means for gravitatingly holding the sleeve 17 in its locked position.

The hook hereinbefore described is designed particularly for suspending steam heat connectors on railroad cars and is adapted to automatically lock the suspension means to the connectors. In this manner the steam connector will not become loose under vibration or jars, the suspension hook herein disclosed being such that the complementary hook forming members are gravitatingly locked in their clamping position.

The hook is readily applied to the article which is to be suspended by engaging one of the hook members, such as member 10, on the article, with the other hook member 11 raised upwardly to the dotted line position shown in Figure 1. The second hook member 11 may then be released or may be forcibly lowered to clamping position so than the shank 15 will be in confronting position to the shank 12. When the two shanks 12 and 15 are in lengthwise confronting position the locking sleeve 17 will automatically or gravitatingly drop downward to its locked position.

I do not mean to confine myself to the exact details of construction herein disclosed, but claim all variations falling within the purview of the appended claim.

What I claim is:

A suspension hook comprising a pair of complementary semi-circular end abutting hook members, an elongated shank carried by one of said members, a supporting hook carried by said shank, a shank carried by the other member shorter in length than the first named shank, a pivot intermediate the length of said first shank connecting said shanks together, a locking tubular sleeve slidably engaging about said shanks, said sleeve when in locking position engaging about the entire length of both shanks below said pivot, and when in released position being wholly disposed on said first shank above said pivot out of engagement with the shorter one of said shanks, and a pair of oppositely extending relatively heavy lugs carried by said sleeve providing handles for moving said sleeve endwise and also providing weight means for gravitatingly moving said sleeve to locking position.

WILDER D. HERNDON.

REFERENCES CITED

The following references are of record in the file of this patent:

UNITED STATES PATENTS

| Number | Name | Date |
|---|---|---|
| 497,512 | Beaton | May 16, 1893 |
| 656,923 | Beard | Aug. 28, 1900 |
| 824,544 | Hossege | June 26, 1906 |
| 850,623 | Clark | Apr. 16, 1907 |
| 851,505 | Ernst | Apr. 23, 1907 |
| 953,707 | Pearce | Apr. 5, 1910 |
| 978,912 | Mack | Dec. 20, 1910 |